United States Patent [19]

Brück et al.

[11] 4,427,817
[45] Jan. 24, 1984

[54] OPEN-CHAIN ACETALS OR KETALS AS NON-DISCOLORING ANTIOZONANTS FOR RUBBER

[75] Inventors: Dieter W. Brück, Cologne; Werner Jeblick, Leverkusen; Heinrich Königshofen, Bergisch Gladbach; Ernst Roos, Odenthal; Lother Ruetz, Dormagen, all of Fed. Rep. of Germany

[73] Assignee: Bayer Aktiengesellschaft, Leverkusen, Fed. Rep. of Germany

[21] Appl. No.: 365,988

[22] Filed: Apr. 6, 1982

[30] Foreign Application Priority Data

Apr. 10, 1981 [DE] Fed. Rep. of Germany ....... 3114639

[51] Int. Cl.³ .............................................. C08K 5/06
[52] U.S. Cl. ..................................... 524/367; 524/83; 524/96; 524/99; 524/104; 524/110; 524/111
[58] Field of Search .................. 260/800, 810; 524/83, 524/96, 367

[56] References Cited

U.S. PATENT DOCUMENTS

| | | | |
|---|---|---|---|
| 2,360,898 | 10/1944 | Saarbach | 524/367 |
| 3,558,555 | 1/1971 | Gruber | 524/367 |
| 3,563,947 | 2/1971 | Gruber | 524/367 |
| 3,639,485 | 2/1972 | Nast et al. | 524/367 |
| 4,088,630 | 5/1978 | Roos et al. | 524/108 |

Primary Examiner—Lorenzo B. Hayes
Assistant Examiner—R. A. White
Attorney, Agent, or Firm—Connolly and Hutz

[57] ABSTRACT

The use of open-chain acetals or ketals corresponding to the following general formula

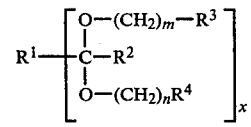

as non-discoloring anti-ozonants for natural and/or synthetic rubber.

4 Claims, No Drawings

OPEN-CHAIN ACETALS OR KETALS AS NON-DISCOLORING ANTIOZONANTS FOR RUBBER

This invention relates to the use of open-chain acetals/ketals corresponding to the general formula (I) below and containing at least one cyclic, unsaturated bond for the production of non-discolouring natural or synthetic rubbers protected against degradation by ozone.

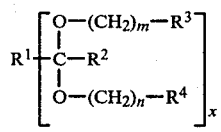

In the general formula (I) above:

n and m are the same or different and represent integers of from 0 to 12;

$x = 1, 2$;

$R^1$ and $R^2$ are the same or different and represent hydrogen, $C_1$–$C_5$- alkyl optionally substituted one or more times by halogen and/or $C_1$–$C_4$-alkyl, $C_1$–$C_6$-alken(dien)yl optionally substitued one or more times by halogen and/or $C_1$–$C_4$-alkyl, $C_5$–$C_7$-cycloalkenyl or bicycloalkenyl optionally substituted one more times by halogen and/or $C_1$–$C_4$-alkyl, $C_6$–$C_{10}$-aryl, optionally substituted one or more times by halogen and/or $C_1$–$C_4$-alkyl and/or $C_1$–$C_4$-alkoxy, $C_7$–$C_8$-alkylaryl optionally substituted one or more times by halogen and/or $C_1$–$C_4$-alkyl and/or $C_1$–$C_4$ alkoxy, $C_5$–$C_6$-heteroaryl containing one or more O, S, N atoms as heteroatom(s), $R^3$ and $R^4$ are the same or different and have the same meaning as $R^1$ and $R^2$ with at least one of the radicals $R^1$, $R^2$, $R^3$ or $R^4$ representing a cyclic or bicyclic unsaturated $C_5$–$C_7$-radical, mentioned above.

Where $x = 2$, the radical $R^1$ or $R^2$ is a $C_1$–$C_5$-alkylene, $C_1$–$C_6$-alken (dien)ylene, $C_5$–$C_7$-cycloalkylene, $C_6$–$C_{10}$-arylene or a $C_7$–$C_8$-alkyl arylene radical. The radicals may be substituted as mentioned in more detail above.

The following are examples of the compounds used in accordance with the present invention, although this list does not in any way limit the nature or scope of the invention:

formaldehyde-bis-($\Delta^3$-tetrahydrobenzyl)-acetal;
formaldehyde-bis-($\Delta^3$-methyltetrahydrobenzyl)-acetal;
formaldehyde-bis-(bicyclo-[2,2,1]-hept-5-en-2-ylmethyl)-acetal;
acetaldehyde-bis-($\Delta^3$-tetrahydrobenzyl)-acetal;
monchloroacetaldehyde-bis-($\Delta^3$-tetrahydrobenzyl)-acetal;
monochloroacetaldehyde-bis-(bicyclo[2,2,1]-hept-5-en-2-ylmethyl)-acetal;
trichloroacetaldehyde-bis-($\Delta^3$-tetrahydrobenzyl)-acetal;
benzaldehyde-bis-($\Delta^3$-methyltetrahydrobenzyl)-acetal;
benzaldehyde-bis-(bicyclo-[2,2,1]-hept-5-enylmethyl)-acetal;
furfural-bis-($\Delta^3$-tetrahydrobenzyl)-acetal;
dihydropyran-2-aldehyde-bis-($\Delta^3$-tetrahydrobenzyl)-acetal;
pyridine-2-aldehyde-bis-($\Delta^3$tetrahydrobenzyl)-acetal;
methyl-cyclohex-3- enylketone-bis-(bicyclo-[2,2,1]-hept-5-en-2-ylmethyl)-ketal;
methyl-cyclohex-3-enylketone-bis-($\Delta^3$-tetrahydrobenzyl)-ketal;
methyl-cyclohex-3-enlketone-bis-benzyl-ketal;
methyl-cyclohex-3-enylketone-bis-ethyl-ketal;
acetone-bis-($\Delta^3$-tetrahydrobenzyl)-ketal;
acetone-bis-(bicyclo[2,2,1]-hept-5-en-2-ylmethyl)-ketal;
$\Delta^3$-tetrahydrobenzaldehyde-bis-($\Delta^3$-tetrahydrobenzyl)-acetal;
$\Delta^3$-tetrahydrobenzaldehyde-bis-ethyl-acetal;
$\Delta^3$-tetrahydrobenzaldehyde-bis-benzyl-acetal;
$\Delta^3$-tetrahydrobenzaldehyde-bis-(bicyclo-[2,2,1]-hept-5-en-2-ylmethyl)-acetal;
$\Delta^3$-methyltetrahydrobenzaldehyde-bis-($\Delta^3$-tetrahydrobenzyl)-acetal;
$\Delta^3$-methyltetrahydrobenzaldehyde-bis-($\Delta^3$-methyltetrahydrobenzyl)-acetal;
$\Delta^3$-methyltetrahydrobenzaldehyde-bis-(bicyclo-[2,2,1]-hept-5-en-2-ylmethyl)-acetal;
$\Delta^3$-methyltetrahydrobenzaldehyde-bis-benzyl-acetal;
$\Delta^3$-methyltetrahydrobenzaldehyde-bis-cyclohexyl-acetal;
bicyclo-[2,2,1]-hept-5-en-2-aldehyde-bis-($\Delta^3$-tetrahydrobenzyl)-acetal;
bicyclo-[2,2,1]-hept-5-en-2-aldehyde-bis-($\Delta^3$-methyltetrahydrobenzyl)-acetal;
bicyclo-[2,2,1]-hept-5-en-2-aldehyde-bis-(bicyclo-[2,2,1]-hept-5-en-2-ylmethyl)-acetal;
bicyclo-[2,2,1]-hept-5-en-2-aldehyde-bis-benzyl-acetal; and
bicyclo-[2,2,1]-hept-5-en-2-aldehyde-bis-cyclohexyl-acetal.

Of these compounds, it is preferred to use
$\Delta^3$-tetrahydrobenzaldehyde-bis-($\Delta^3$-tetrahydrobenzyl)-acetal;
$\Delta^3$-tetrahydrobenzaldehyde-bis-bicyclo-[2,2,1]-hept-5-en-2-ylmethyl)-acetal;
bicyclo-[2,2,1]-hept-5-en-2-aldehyde-bis-($\Delta^3$-tetrahydrobenzyl)-acetal;
bicyclo-[2,2,1]-hept-5-en-2-aldehyde-bis-bicyclo-[2,2,1]-hept-5-en-2-ylmethyl)-acetal;
formaldehyde-bis-($\Delta^3$-tetrahydrobenzyl)-acetal; and
formaldehyde-bis-(bicyclo-[2,2,1]-hept-5-en-2-ylmethyl)-acetal.

The acetals or ketals may be produced by methods known from the literature as described for example by the following general reaction equation:

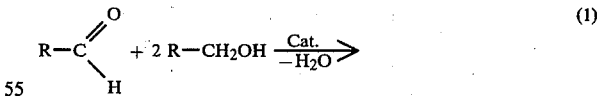

$R = R^1$, $R^2$, $R^3$, $R^4$ as defined above

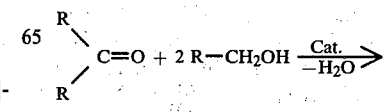

-continued

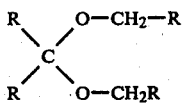

It is also possible to use mixtures of alcohols or mixtures of aldehydes or ketones.

The following is one example of a procedure which may generally be adopted for the production of one of the preferred compounds:

The reaction of formaldehyde with bicyclo-[2,2,1]-hept-5-en-2-yl-methylalcohol may be carried out using an acid catalysts either in the presence or absence of a solvent. Suitable solvents are, for example, solvents which form an azeotrope with water, for example benzene, toluene, cyclohexane and methylene chloride, etc. At least two moles of alcohol are required per mole of formaldehyde. The reaction may also be carried out in the adsence of a separate solvent, for which purpose the alcohol may even be used in excess. The water formed may be removed by distillation or, if desired, by the addition of water remowing agents such as zeolites. The following catalysts are suitable sulfuric acid, phosphoric acid, p-toluene sulfonic acid, sulfur dioxide and boron trifluoride, etc. Working up is carried out by known methods, for example by distillation under a high vacuum, by removing the volatile fractions in a thin-layer evaporator, by recrystallisation, etc.

The compounds are solid or liquid substances which may readily be incorporated and distributed homogenously in the crude rubber. They are equivalent in their anti-ozonant effect to known anti-ozonants (DE-AS No. 1,917,600, DE-AS No. 2,548,911, DE-AS No. 1,693,163), but are considerably less volatile which may be regarded as a major advantage in the processing of rubber. In addition, the products are not attended by any problems of odour so that there is no need to use odour-improving additives.

Suitable rubbers include natural or synthetic rubber obtained for example from butadiene, dimethyl butadiene, chloroprene, isoprene and its homologs, or copolymers of conjugated diolefins such as these with vinyl compounds, such as styrene, α-methyl styrene, acrylonitrile, methacrylonitrile, acrylates, methacrylates, and also terpolymers of ethylene, propylene with at least one unconjugated diene, for example dicyclopentadiene, 5-ethylidene-2-norbornene or 1,4-hexadiene.

The anti-ozonants may be mixed into the rubbers in conventional manner for example on mixing rolls or in an internal mixer. They are added before or at the same time as the other ingredients, although they may also be added as the last ingredient of the mixture.

The quantity in which the anti-ozonant is used amounts to between 0.05 to 10% by weight, based on rubber. The rubbers may contain the usual additives. Sulfur for example may be used as the vulcanising agent. Suitable accelerators are thiazoles, such as 2-mercaptobenzthiazole, dibenzothiazyl disulfide, sulfenamides, such as benzothiazyl-2-cyclohexyl sulfenamide, benzothiazyl-2-t-butyl sulfenamide or benzthiazyl sulfenic acid morpholide, guanidines, such as diphenyl guanidine or di-O-tolyl guanidine, dithiocarbamates, such as zinc diethyl dithiocarbamate, thiurams, such as tetramethylthiuram disulfide and ethylene thiourea. In addition, accelerator mixtures may be used. It is also possible to use other auxiliaries, for example fillers, such as carbon black or chalk, oxidation inhibitors, waxes, pigments, zinc oxide, stearic acid and processing oils. The rubber is vulcanised by heating to the usual temperatures, preferably to a temperature in the range from 120° to 170° C., although vulcanisation may even be carried out at higher or lower temperatures.

The following Examples relating to the preferred substances are intended to illustrate the invention without limiting it in any way.

EXAMPLE 1

Formaldehyde-bis-(bicyclo-[2,2,1]-hept-5-en-2-ylmethyl)-acetal (4 moles) of bicyclo-[2,2,1]-hept-5-en-2-ylmethyl alcohol and 200 g (2 moles) of a 30% by weight aqueous formaldehyde solution are combined with 1.5 g of p-toluene sulfonic acid at 20° C. and heated with stirring to 50°-60° C. At the same time, a water jet vacuum is applied, initiating a vigorous distillation of water from the reaction mixture. When the distillation abates, the internal temperature is increased to 115° C. (2 hours). The reaction product is then distilled under a high vacuum in a 15 cm Vigreux column, a colourless oil being obtained.

B.p: 120°-125° C./0.mm. Yield: 313 g=60% of the theoretical yield.

EXAMPLE 2

Bicyclo-[2,2,1]-hept-5-en-2-aldehyde-bis-(bicyclo-[2,2,1]-hept-5-en-2-yl-methyl)-acetal 122 g (1 mole) of bicyclo-[2,2,1]-hept-5-en-2-aldehyde and 248 g (2 moles) of bicyclo-[2,2,1]-hept-5-en-2-yl-methyl alcohol are dissolved in 600 ml of cyclohexane. A mixture of 3.5 g of p-toluene sulfonic acid and 2.6 g of quinoline are added to the resulting solution which is then boiled on a water separator until the removal of water has ceased. The product is then carefully washed until it shows a neutral reaction, dried with potassium carbonate and distilled. A colourless oil is obtained, solidifying into a wax-like substance.

B.p.: 163°-168° C./0.05 mbar. Yield: 284 g=80% of the theoretical yield.

EXAMPLE 3

The following rubber mixture was prepared on mixing rolls:

polychloroprene: 100.0 parts by weight;
magnesium oxide: 4.0 parts by weight;
stearic acid: 0.5 part by weight;
precipitated silica (BET-surface: 180 m$^3$/g): 20.0 parts by weight;
soft koalin: 170.0 parts by weight;
titanium dioxide: 5.0 parts by weight;
antimony oxide: 5.0 parts by weight;
naphthenic mineral oil plasticiser: 20.0 parts by weight;
chloroparaffin: 10.0 parts by weight;
ethylene thiourea: 1.2 parts by weight;
zinc oxide: 5.0 parts by weight;
anti-ozonant according to the Tables.

Test specimens measuring 0.4×4.5×4.5 cm were prepared from these mixtures by vulcanisation (in a press for 30 minutes at 150° C.).

Groups of four test specimens were then clamped into a plastics frame in such a way that surface elongations of 10, 20, 30 and 60% were obtained.

The stretched test specimens were then exposed to an air stream containing 1000 parts by weight of ozone to 100 million parts of air at room temperature. After 2,4,6,8,24,48,72, 96 and 168 hours, the test specimens were visually inspected for any cracks. The periods of time elasping before the first cracks were noticed are shown in the following Tables.
The tests were stopped after 168 hours.

TABLE 1

| Elongation in % | 10 | 20 | 30 | 60 |
|---|---|---|---|---|
| no anti-ozonant (comparison formaldehyde-bis-(bicyclo-[2,2,1]-hept-5-en-2-yl-methyl)-acetal (Example 1) | 24 | 24 | 24 | 8 |
| 0.5% by weight | 168 | 168 | 168 | 168 |
| 1.0% by weight | 168 | 168 | 168 | 168 |

TABLE 2

| Elongation in % | 10 | 20 | 30 | 60 |
|---|---|---|---|---|
| no anti-ozonant (comparison) bicyclo-[2,2,1]-hept-5-en-2-aldehyde-bis-(bicyclo-[2,2,1]-hept-5-en-2-yl-methyl)-acetal | 48 | 24 | 24 | 6 |
| 0.5% by weight | 168 | 168 | 168 | 168 |
| 1.0% by weight | 168 | 168 | 168 | 168 |

EXAMPLE 4

The following rubber mixture was prepared on mixing rolls:
natural rubber: 100.0 parts by weight;
zinc oxide: 10.0 parts by weight;
precipitated chalk: 160.0 parts by weight;
titanium dioxide: 10.0 parts by weight;
stearic acid: 0.7 part by weight;
anti-ozonant wax: 2.0 parts by weight;
dibenzothiazyldisulfide: 1.0 part by weight;
hexamethylene tetramine: 0.25 part by weight;
sulfur: 2.2 parts by weight;
anti-ozonant: 4.0 parts by weight.

The test specimens are press-vulcanised for 30 minutes at 140° C. Testing was again carried out in the same way as described in Example 3, except that instead of 1000 parts the concentration of ozone amounted to 200 parts of ozone per 100 million parts of air.

TABLE 3

| Elongation in % | 10 | 20 | 30 | 60 |
|---|---|---|---|---|
| no anti-ozonant (comparison) | 4 | 2 | 2 | 2 |
| formaldehyde-bis-(bicyclo-[2,2,1]-hept-5-en-2-yl-methyl)-acetal (Example 1) | >168 | 8 | 6 | 2 |

TABLE 4

| Elongation in % | 10 | 20 | 30 | 60 |
|---|---|---|---|---|
| no anti-ozonant (comparison) | 4 | 2 | 2 | 2 |
| bicyclo[2,2,1]-hept-5-en-2-aldehyde-bis-(bicyclo-[2,2,1]-hept-5-en-2-yl-methyl)-acetal (Example 2) | >168 | >168 | 6 | 6 |

EXAMPLE 5

The following rubber mixture was prepared on mixing rolls:
styrene-butadiene copolymer: 100.0 parts by weight;
zinc oxide: 5.0 parts by weight;
carbon black (N 220): 55.0 parts by weight;
naphthenic mineral oil plasticiser: 2.0 parts by weight;
highly aromatic mineral oil plasticiser: 2.0 parts by weight; stearic acid: 2.0 parts by weight;
anti-ozonant wax: 1.0 part by weight;
benzothiazyl-2,2-cyclohexylsulfenamide: 1.3 parts by weight;
sulfur: 1.6 parts by weight;
anti-ozonant according to the Tables.

The test specimens are press-vulcanised for 30 minutes at 150° C. Testing was again carried out in the same way as described in Example 3, except that, instead of 1000 parts, by concentration of ozone amounted to 200 parts of ozone per 100 million parts of air.

TABLE 5

| Elongation in % | 10 | 20 | 30 | 60 |
|---|---|---|---|---|
| no anti-ozonant (comparison) | 4 | 2 | 2 | 2 |
| formaldehyde-bis-(bicyclo-[2,2,1]-hept-5-en-2-yl-methyl)-acetal (Example 1) 3.0 parts by weight | >168 | >168 | 2 | 2 |

TABLE 6

| Elongation in % | 10 | 20 | 30 | 60 |
|---|---|---|---|---|
| no anti-ozonant (comparison) | 6 | 2 | 2 | 2 |
| bicyclo-[2,2,1]-hept-5-en-2-aldehyde-bis-(bicyclo-[2,2,1]-hept-5-en-2-yl-methyl)-acetal (Example 2) 4.0 parts by weight | >168 | >168 | 168 | 2 |

EXAMPLE 6

The following rubber mixture was prepared on mixing rolls:
styrene-butadiene copolymer: 50.0 parts by weight;
natural rubber: 50.0 parts by weight;
zinc oxide: 5.0 parts by weight;
precipitated chalk: 120.0 parts by weight;
precipitated silica (BET-surface: 180 m$^2$/g): 35.0 parts by weight;
dimethyl glycol: 2.5 parts by weight;
naphthenic mineral oil plasticiser: 10.0 parts by weight;
stearic acid: 1.0 part by weight;
anti-ozonant wax: 2.0 parts by weight;
benzothiazyl-2-cyclohexysulfenamide: 0.8 part by weight;
diphenyl guanidine: 0.3 part by weight;
tetramethylthiuram disulfide: 2.0 parts by weight;
sulfur: 2.0 parts by weight;
anti-ozonant: 4.0 parts by weight.

The test specimens were press-vulcanised for 15 minutes at 140° C. Testing was again carried out as described in Example 3, except that instead of 1000 parts the concentration of ozone amounted to 200 parts of ozone per 100 million parts of air

TABLE 7

| Elongation in % | 10 | 20 | 30 | 60 |
|---|---|---|---|---|
| no anti-ozonant (comparison) | 6 | 4 | 4 | 2 |
| formaldehyde-bis-(bicyclo-[2,2,1]-hept-5-en-2-yl-methyl)-acetal (Example 1) | 168 | 8 | 4 | 2 |

TABLE 8

| Elongation in % | 10 | 20 | 30 | 60 |
|---|---|---|---|---|
| no anti-ozonant (comparison | 2 | 2 | 2 | 2 |
| bicyclo-[2,2,1]-hept-5-en-2-aldehyde-bis-(bicyclo-[2,2,1]-hept-5-en-2-yl methyl)-acetal (Example 2) | >168 | 6 | 6 | 2 |

We claim:

1. Process for stabilising natural and/or synthetic rubber against ozone attack by incorporating into rubber an antiozonant whereby as an antiozonant open-chain acetals or ketals corresponding to the following general formula:

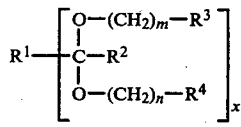

in which
n and m are the same or different and represent integers of from 0 to 12;
x = 1 or 2;
$R^1$ and $R^2$ are the same or different and represent hydrogen, $C_1$-$C_5$-alkyl or alkylene optionally substituted one or more times by halogen and/or $C_1$-$C_4$-alkyl; $C_1$-$C_6$-alken-(dien)-yl or alken(dien)ylene optionally substituted one or more times by halogen and/or $C_1$-$C_4$-alkyl; $C_5$-$C_7$-cyclo-or bicyclo-alkenyl or alkylene optionally substituted one or more times by halogen and/or $C_1$-$C_4$-alkyl; $C_6$-$C_{10}$-aryl or arylene optionally substituted one or more times by halogen and/or $C_1$-$C_4$-alkyl and/or $C_1$-$C_4$-alkoxy, $C_7$-$C_8$-alkylaryl or alkylarylene optionally substituted one or more times by halogen and/or $C_1$-$C_4$-alkyl and/or alkoxy, $C_5$-$C_6$-heteroaryl containing one or more O, S, N atoms as heteroatom(s),
$R^3$ and $R^4$ are the same or different, and have the same meaning as $R^1$ and $R^2$ with at least one of the radicals $R^1$, $R^2$, $R^3$ or $R^4$ representing a cyclic or bicyclic unsaturated $C_5$-$C_7$-radical, are used.

2. Process as claimed in claim 1, characterised in that the radical $R^1$ is a cyclic or bicyclic unsaturated radical.

3. Process as claimed in claim 1 wherein condensation products characterised in that $R^3$ and $R^4$ represent a cyclic or bicyclic unsaturated radical are used.

4. Process as claimed in claim 1 wherein condensation products are used in quantities of from 0.05 to 10% by weight, based on the rubber.

* * * * *